(12) United States Patent
Lin et al.

(10) Patent No.: US 7,953,037 B2
(45) Date of Patent: May 31, 2011

(54) ELECTRONIC DEVICE FOR ACQUISITION OF A DUMMY PAGING MESSAGE

(75) Inventors: Shin-Yi Lin, Kaohsiung (TW); Ho-Chi Huang, Hsinchu Hsien (TW); Chun-Ming Kuo, Taipei County (TW)

(73) Assignee: Mediatek Inc., Hsin-chu (TW)

( * ) Notice: Subject to any disclaimer, the term of this patent is extended or adjusted under 35 U.S.C. 154(b) by 913 days.

(21) Appl. No.: 11/855,269

(22) Filed: Sep. 14, 2007

(65) Prior Publication Data

US 2009/0075679 A1    Mar. 19, 2009

(51) Int. Cl.
*H04Q 7/20* (2006.01)
*H04W 4/00* (2009.01)

(52) U.S. Cl. ........................ 370/328; 455/458

(58) Field of Classification Search ............... 370/310, 370/328; 455/343.2, 458
See application file for complete search history.

(56) References Cited

U.S. PATENT DOCUMENTS

| | | | | |
|---|---|---|---|---|
| 5,978,366 | A * | 11/1999 | Massingill et al. | 370/337 |
| 6,680,920 | B1 * | 1/2004 | Wan | 370/311 |
| 6,795,425 | B1 * | 9/2004 | Raith | 370/345 |
| 7,107,080 | B2 * | 9/2006 | Patel et al. | 455/574 |
| 7,158,795 | B2 * | 1/2007 | Zhang et al. | 455/452.2 |
| 7,630,701 | B2 * | 12/2009 | Sollenberger et al. | 455/343.3 |
| 2001/0023184 | A1 * | 9/2001 | Kalveram et al. | 455/426 |
| 2004/0085916 | A1 * | 5/2004 | Nakamura et al. | 370/282 |
| 2008/0182545 | A1 * | 7/2008 | Le Faucheur | 455/343.2 |
| 2009/0209196 | A1 * | 8/2009 | Haverty | 455/1 |
| 2010/0150097 | A1 * | 6/2010 | Sun et al. | 370/329 |

FOREIGN PATENT DOCUMENTS

| | | |
|---|---|---|
| EP | 1111943 | 6/2001 |
| EP | 1670274 | 6/2006 |
| WO | WO 9828931 | 7/1998 |

OTHER PUBLICATIONS

DE Office Action mailed Apr. 23, 2008.

* cited by examiner

*Primary Examiner* — Chi H Pham
*Assistant Examiner* — Robert Lopata
(74) *Attorney, Agent, or Firm* — Thomas Kayden (57) ABSTRACT

The invention provides an electronic device for acquisition of a dummy paging message. In an embodiment, the electronic device comprises a dummy pattern generator, a receiver, and a paging channel handler. The dummy pattern generator provides a first artificial pattern according to a previously received result corresponding to a dummy paging message. The receiver receives a first burst for a paging message. The paging channel handler controls the receiver to recover a first data content for the paging message according to the first burst and the first artificial pattern, determines whether the first data content represents a dummy paging message, and directs the receiver not to activate to receive remaining bursts for the paging message when the first data content represents a dummy paging message. The dummy paging message is employed for synchronization between a mobile station comprising the electronic device, and a serving base station.

20 Claims, 12 Drawing Sheets

ELECTRONIC DEVICE FOR ACQUISITION OF A DUMMY PAGING MESSAGE

BACKGROUND OF THE INVENTION

1. Field of the Invention

The invention relates to wireless communication, and more particularly to processing of dummy paging messages and power saving.

2. Description of the Related Art

Figure 1:
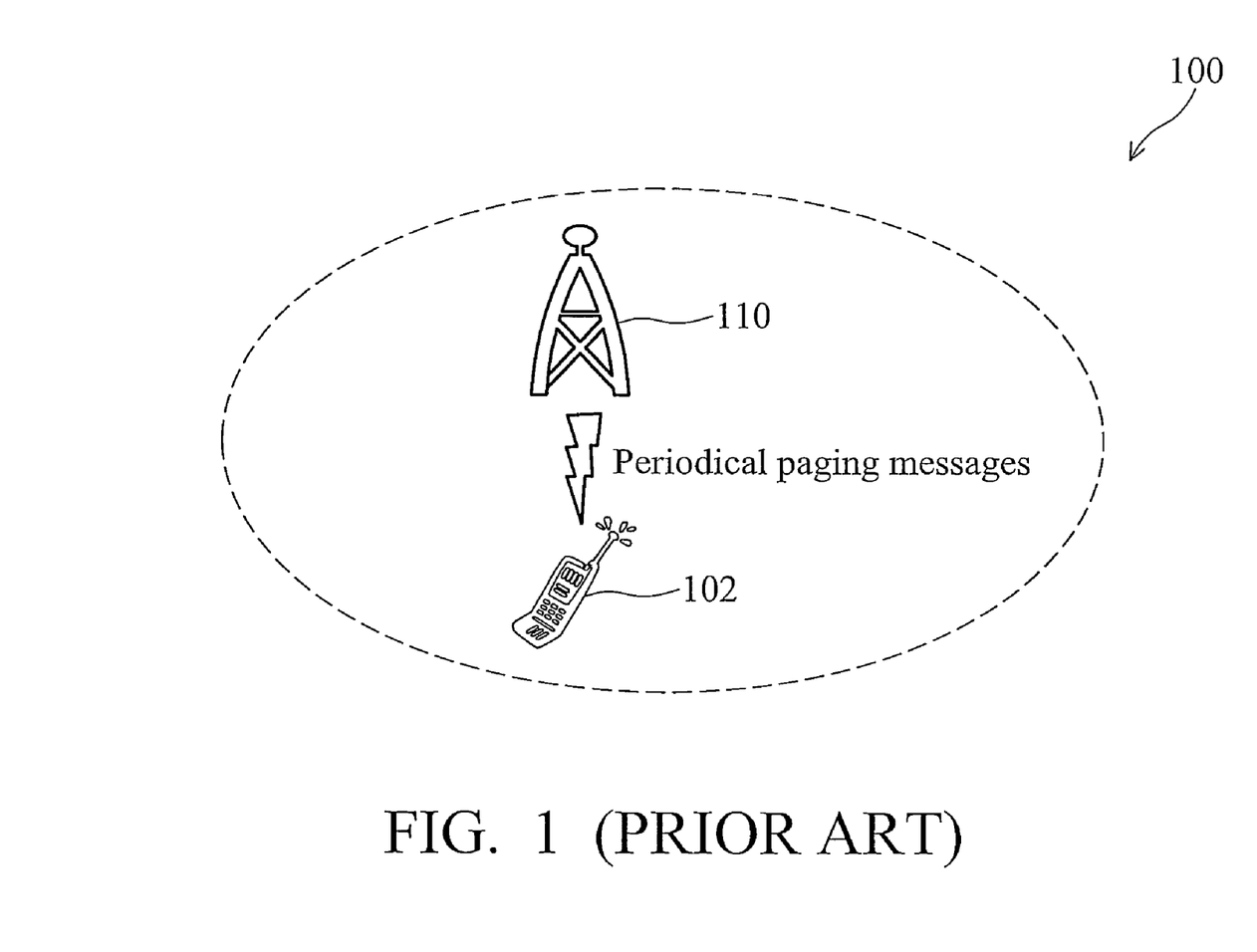
FIG. 1 shows a conventional wireless communication system.

Referring to FIG. 1, a wireless communication system 100 is shown. The wireless communication system 100 comprises a mobile station 102 and a serving base station 110. In one embodiment, the mobile station 102 is a cell phone or smart phone. When a near-end user (with the mobile station 102) wants to make a call to a far-end user, the near-end user is connected to the far-end user through a wireless communication link between the mobile station 102 and the serving base station 110. When no calls are being made, the serving base station 110 periodically sends paging messages to the mobile station 102 to maintain a wireless communication link between the mobile station 102 and the serving base station 110.

Paging messages transmitted from the serving base station 110 to the mobile station 102 are divided into two categories, dummy paging messages and significant paging messages. Dummy paging messages comprise no significant information and are only used for synchronization between the serving base station 110 and the mobile station 102. Significant paging messages comprise information notifying the mobile station 102, such as a request to establish a link for a phone call or a short message having been received. The mobile station 102 processes all paging messages sent by the serving base station 110 with a receiver with or without specific paging channel handler.

Figure 2:
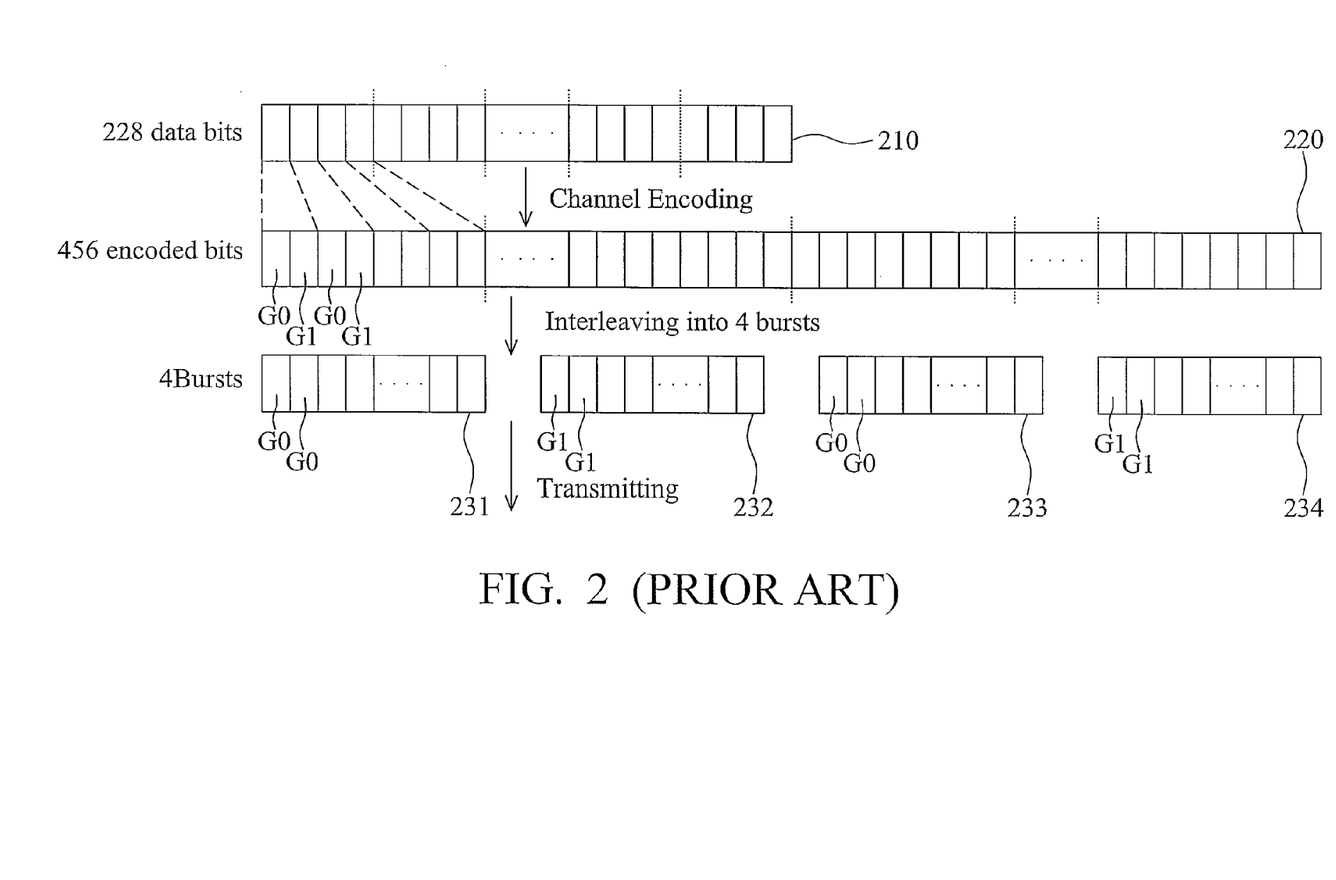
FIG. 2 is a schematic diagram of transmission of paging messages from a serving base station of FIG. 1.

Referring to FIG. 2, a schematic diagram of generation and transmission of paging messages for the serving base station 110 of FIG. 1 is shown. A paging message comprises data content 210 of 228 bits in total. The serving base station 110 then performs a ½-rate channel coding with polynomial G0 and G1 on the 228 bits of data content 210 to obtain an encoded data 220 of 456 bits. In a GSM, GPRS, or EGPRS system, the encoded data 220 is then interleaved into four bursts 231, 232, 233, and 234, each burst comprising 114 bits. The serving base station 110 then sequentially transmits the four bursts 231~234 to the mobile station 102.

Conventionally, the mobile station used to recover full data content using four transmission data bursts. Although the mobile station 102 can recover full data content of a paging message using only two good transmission bursts of the paging message, a conventional mobile station 102 cannot recover full data content of a paging message using only one transmission burst even in noiseless channel. The invention, however, provides a method for recovering full data content of a dummy paging message using only one good transmission burst of the dummy paging message. Thus, time required by the mobile station 102 to process dummy paging messages transmitted from the serving base station 110 is reduced to improve performance of the mobile station 102.

BRIEF SUMMARY OF THE INVENTION

The invention provides an electronic device for acquisition of a dummy paging message. In one embodiment, the electronic device comprises a dummy pattern generator, a receiver, and a paging channel handler. The dummy pattern generator provides a first artificial pattern according to a previously received result corresponding to a dummy paging message. The receiver receives a first burst for a paging message. The paging channel handler controls the receiver to recover a first data content for the paging message according to the first burst and the first artificial pattern, determines whether the decoded data content represents a dummy paging message, and directs the receiver not to active to receive remaining bursts for the paging message when the first data content represents a dummy paging message. The dummy paging message is employed for synchronization between a mobile station comprising the electronic device, and a serving base station. On the other hand, if such early detection mechanism failed, more data bursts can be received for more reliable decoding to recover the whole paging data content.

The invention also provides an electronic device for acquisition of a paging message from a serving base station and measuring of radio frequency signals from a plurality of neighboring base stations. In an embodiment, the electronic device comprises a radio frequency module and a baseband processing module. The radio frequency module receives a burst for a paging message, switches channels and receives the radio frequency signals from the neighboring base stations via the switched channels. The baseband processing module recovers the paging message according to the burst transmitted from the serving cell, and measures strengths of the radio frequency signals of neighboring cells. The reception of the burst, the reception of the radio frequency signals, the acquisition of the paging message, and the measurement of the strengths are performed and completed in one frame duration. The strength of the radio frequency signals are employed to determined signal quality.

The invention provides a method for acquisition of a dummy paging message for a mobile station. First, a first burst for a paging message is received. A first artificial pattern is then provided according to a previously received result corresponding to a dummy paging message. A first data content for the paging message is then recovered according to the first burst and the first artificial pattern. It is determined whether the first data content represents a dummy paging message. Finally, when the first data content represents a dummy paging message, a receiver of the mobile station is directed not to activate to receive remaining bursts for the paging message. The dummy paging message is conventionally transmitted by four bursts and is employed for synchronization between the mobile station and a serving base station.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
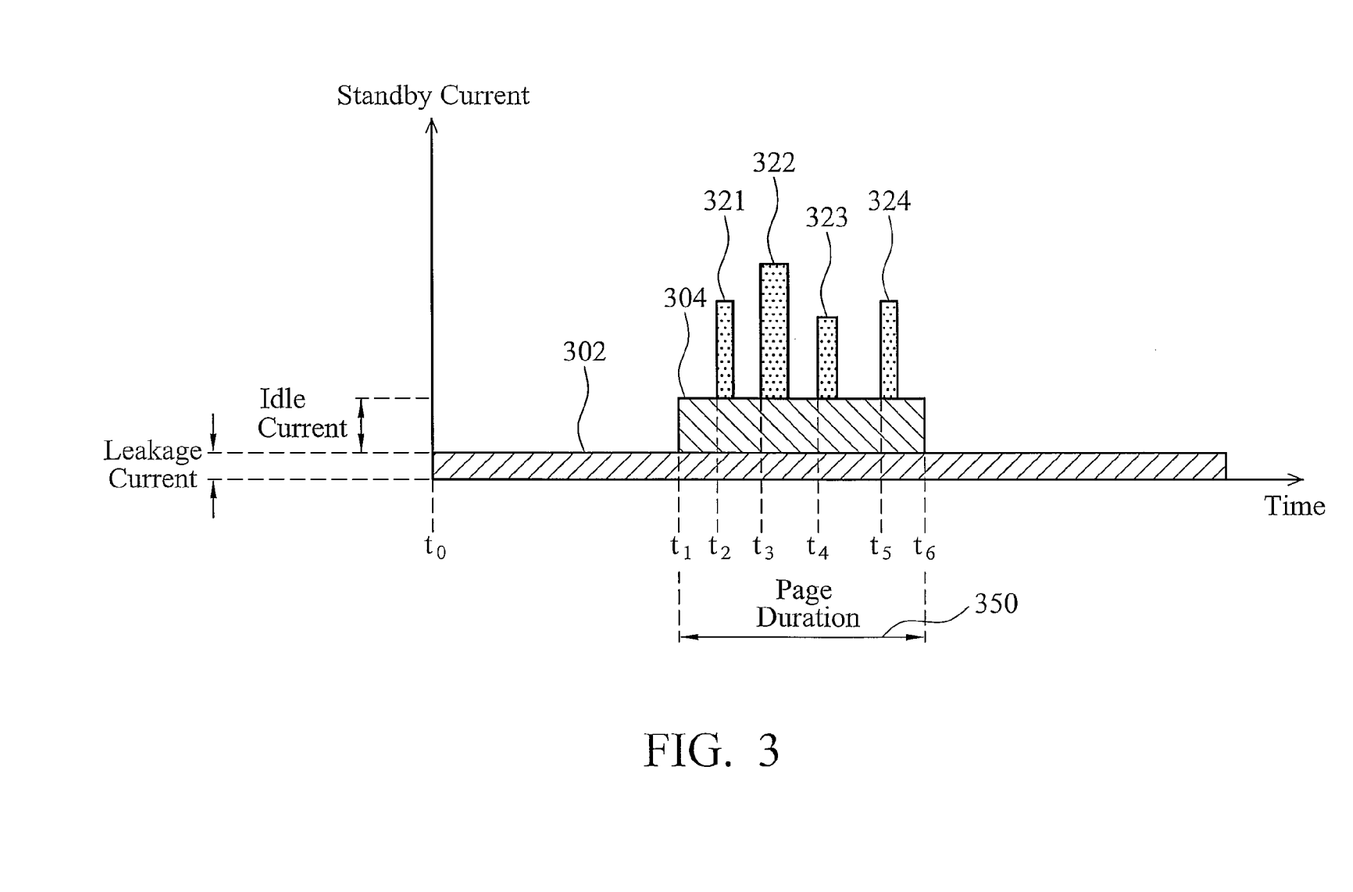
FIG. 3 shows a typical level of a standby current for operating a mobile station in a standby state.

Referring to FIG. 3, a typical level of a standby current for operating a mobile station in a standby state is shown. When no calls are being made, a mobile station enters a standby state (or sleep mode). In the standby state, a mobile station will deactivate and activate only at certain times for receiving paging messages sent by a serving base station. The mobile station then determines whether the received paging message is a significant paging message. When the paging message is a significant message, the mobile station enters a wake up mode to perform relevant operations in response to the received significant message, such as answering an incoming call. When the paging message is a dummy paging message, the mobile station enters a sleep mode until reaching a specific time to receive a next paging message.

In the sleep mode, most modules of the mobile station are disabled, such as a radio frequency (RF) module receiving paging messages, and a baseband processing module decoding paging messages. Thus, the standby current for operating the mobile station in a sleep mode is reduced to only leakage current. For example, the standby current at time to is only the leakage current 302 in FIG. 3. When reaching the next wake up time $t_1$, the RF module and the baseband processing module is enabled and initiated to receive a paging message from a serving base station. The standby current of the mobile station therefore increases to a sum of the leakage current 302 and an idle current 304 at time $t_1$. Because a paging message is encoded and interleaved into four bursts, the mobile station respectively receives and decodes these four bursts, and the standby current correspondingly has four peaks 321, 322, 323, and 324 at times $t_2$, $t_3$, $t_4$, and $t_5$. After the four bursts are completely decoded and a dummy paging message is recovered therefrom, the mobile station returns to a sleep mode and the standby current reduces back to the leakage current again at time $t_6$.

Because a mobile station is equipped with a limited amount of energy, such as a battery, reduced power consumption can extend usable life span of the mobile station. A time period for a mobile station to complete processing of a paging message is referred to as page duration. For example, the period 350 from time $t_1$ to time $t_6$ in FIG. 3 is the page duration for receiving a significant or dummy paging message. It is to be understood that power consumption of the mobile station can be reduced when reception of bursts is reduced. Referring to page duration 350 of FIG. 3, the mobile station typically decodes the dummy paging message according to all four transmission bursts of the dummy paging message. When a dummy paging message can be decoded with only one received burst thereof, power consumption of the mobile station is reduced. Thus, the invention provides an embodiment of a method for decoding a dummy paging message with only one received burst to improve performance of the mobile station. Because most of the paging messages sent by the serving base station are dummy paging messages for synchronization between the mobile station and the serving base station, the power consumption of the mobile station in standby states can be greatly reduced according to embodiments of the invention.

Figure 4:
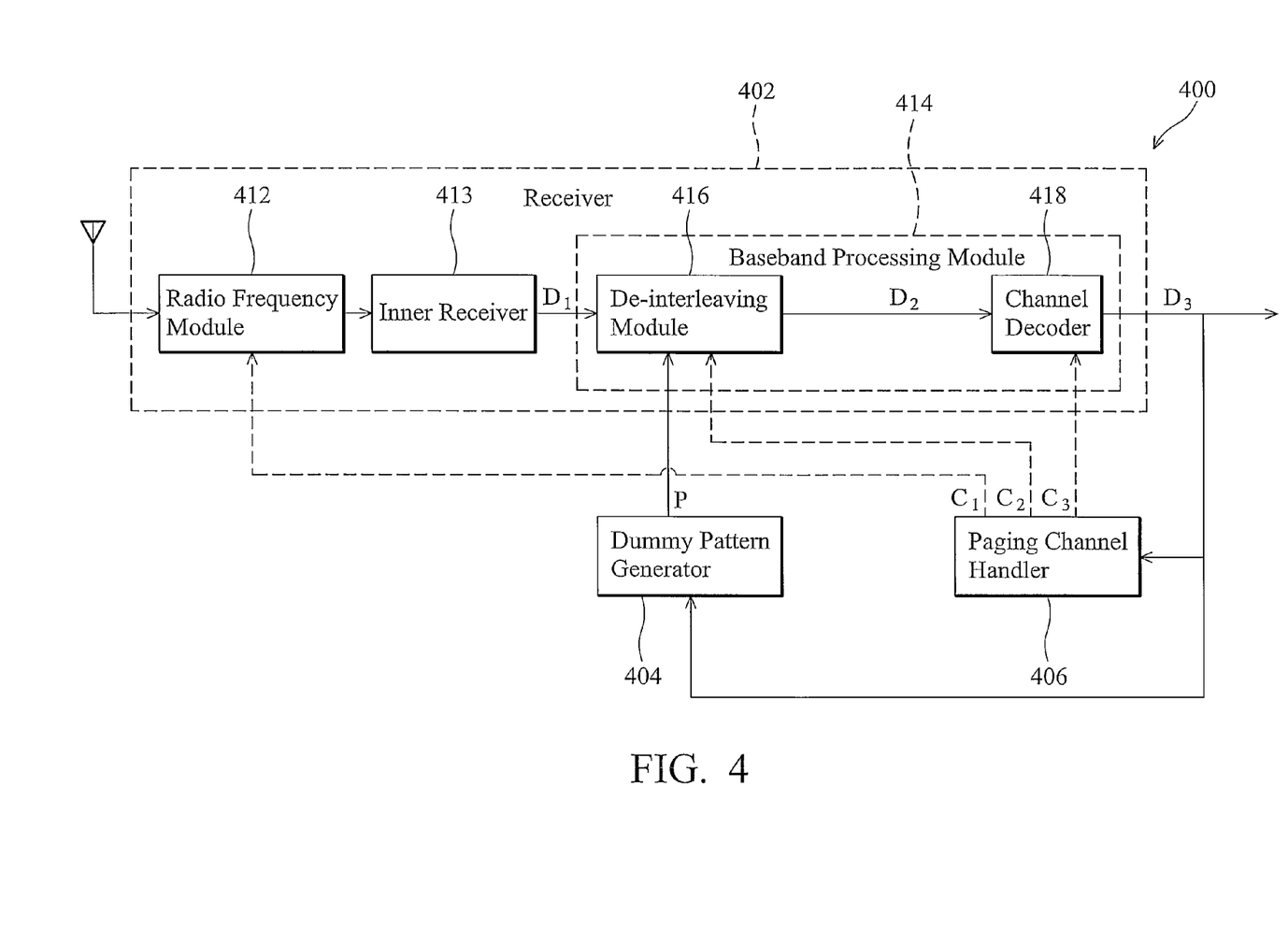
FIG. 4 is a block diagram of a portion of a mobile station for recovering dummy paging messages according to an embodiment of the invention.

Referring to FIG. 4, a block diagram of a portion of a mobile station 400 recovering dummy paging messages according to an embodiment of the invention is shown. The mobile station 400 comprises a receiver 402, a dummy pattern generator 404, and a paging channel handler 406. The receiver 402 comprises a radio frequency module 412, an inner receiver 413, and a baseband processing module 414 comprising a de-interleaving module 416 and a channel decoder 418. When a paging message is sent to the mobile station 400, the radio frequency module 412 first receives a first burst $D_1$ of the paging message. The first burst $D_1$ is then delivered to the baseband processing module 416. Concurrently, the dummy pattern generator 404 provides the baseband processing module 414 with a dummy pattern P according to previously received dummy paging messages. It is to be understood that the baseband processing module 414, the dummy pattern generator 404 and the paging channel handler 406 may be seen as an outer receiver.

Figure 5A:
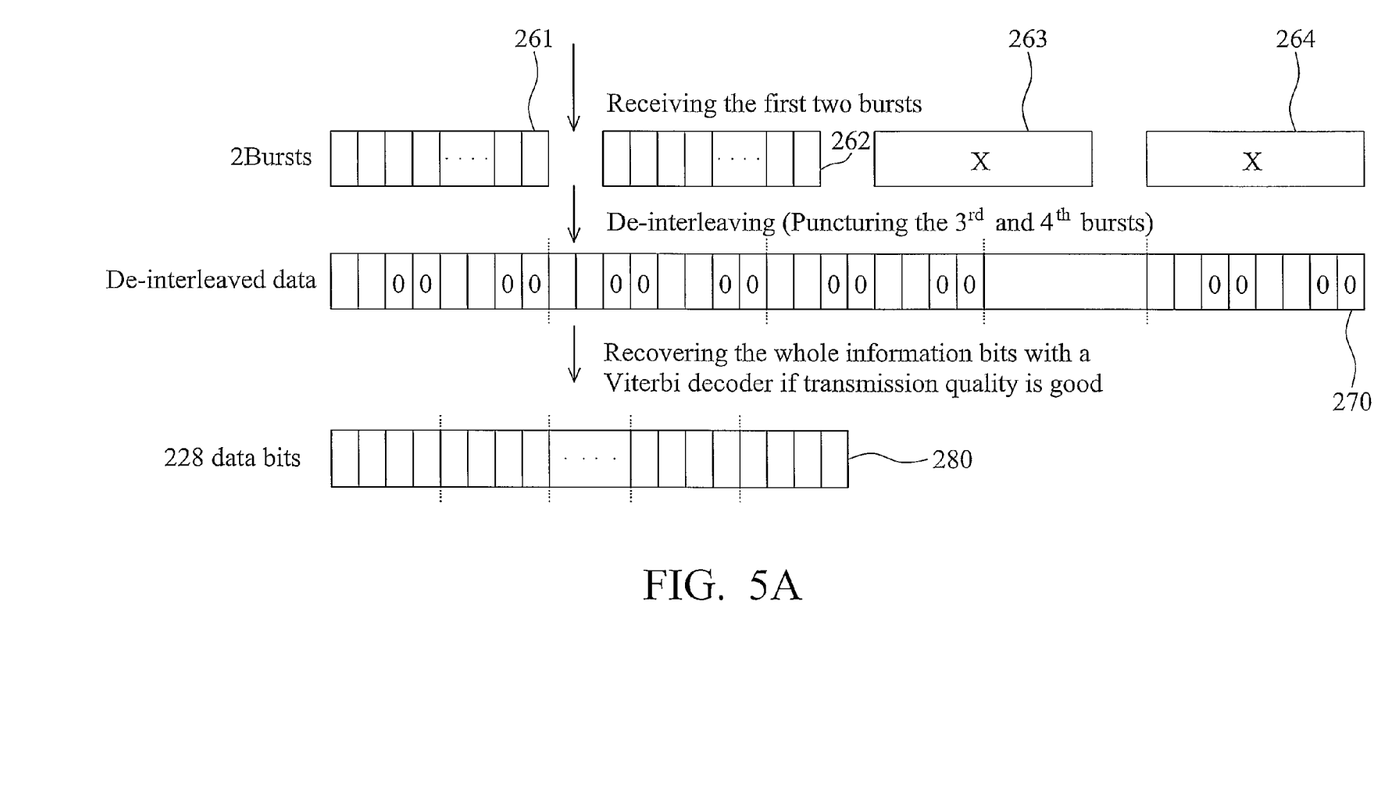
FIG. 5A is a schematic diagram of reception of paging messages for a mobile station according to an embodiment of the invention.

Referring to FIG. 5A, a schematic diagram of reception of paging messages for a mobile station is shown according to an embodiment of the invention. When the transmission quality of the paging message is good, only two bursts are required for recovering full data content of the paging message. The receiver 402 may initially receives a first burst 261 and a second burst 262 of the paging message without reference to previous results. The first burst 261 and the second burst 262 are then de-interleaved and a third burst 263 and a fourth burst 264 are punctured (with punctured locations having a zero value) to obtain a de-interleaved data 270 by the de-interleaving module 416. Those skilled in the art will realize that the de-interleaved data 270 comprises convolutional code generated from an original significant or dummy paging message according to a specific coding algorithm, where the number of bits of the de-interleaved data 270 is more than that of the original significant or dummy paging message. For example, the convolutional code is generated by convolutional coding algorithms according to a code rate ½, where 2 represents the number of output bits and 1 represents the number of input bit. As the convolutional coding is well known to those skilled in this art, further description is omitted here for the sake of brevity. The mobile station 400 then decodes the de-interleaved data 270 with the channel decoder 418 to recover data content 280 of the paging message. The channel decoder 418 examines the accuracy of the data content 280 by using the maximum likely-hood decoding (e.g. the Viterbi decoding) to compute a metric value for each path and then make a decision based upon the accumulated path metric values. When the transmission quality of the paging message is bad, the received first burst 261 and the second burst 262 comprise error bits, and the data content 280 obtained by the mobile station 102 can not pass integrity validation (e.g. CRC validation) because the data content 210 transmitted by the serving base station 110 is interfered with additive white Gaussian noise (AWGN) or other interference signal sources. Thus, a third burst 263 and a fourth burst 264 are required to be received for recovering correct data content 280.

Figure 5B:
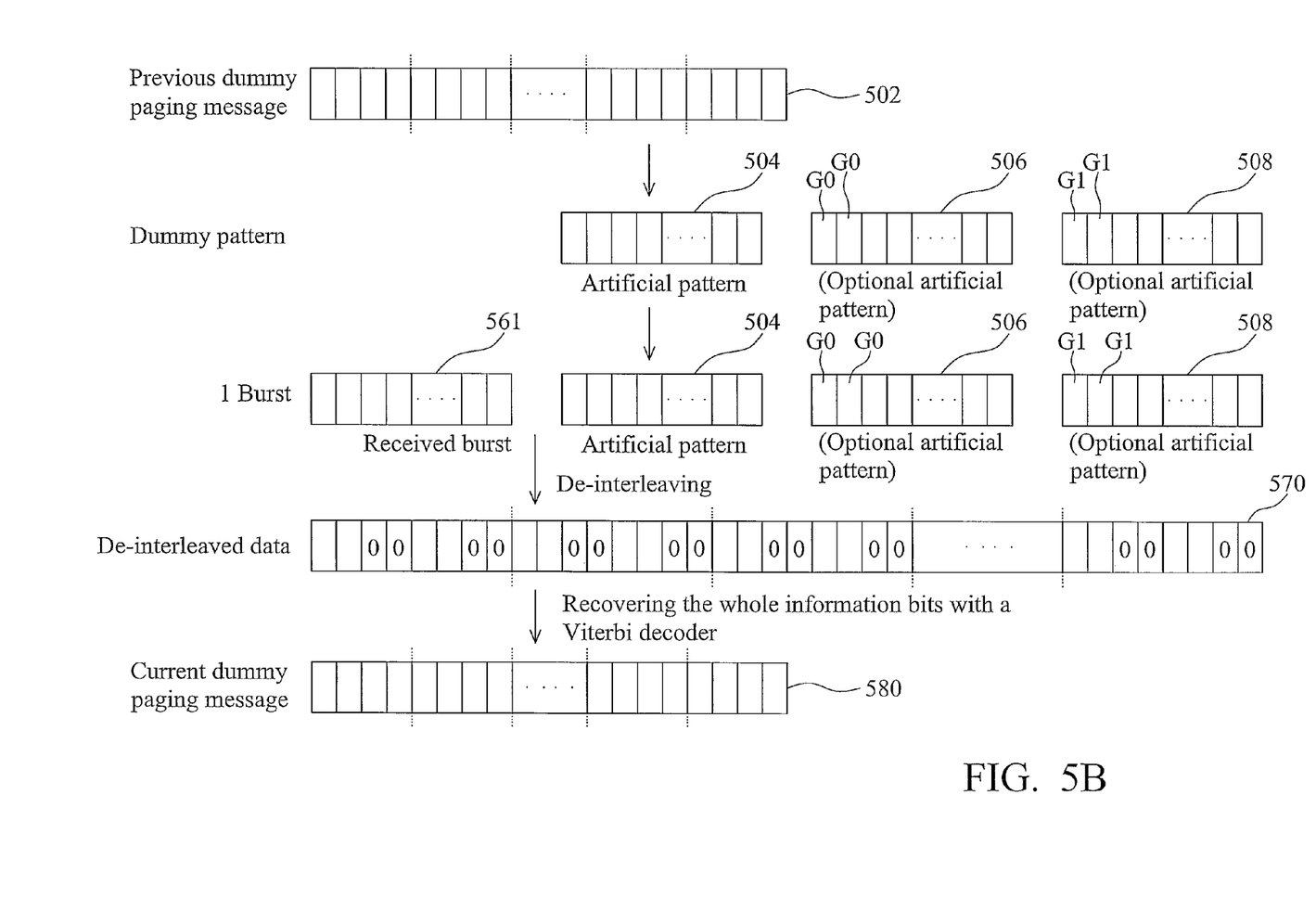
FIG. 5B is a schematic diagram of full data content acquisition of a dummy paging message using only a first received burst for a mobile station according to an embodiment of the invention.

Referring to FIG. 5B, a schematic diagram of full data content acquisition of a dummy paging message using only a first received burst for a mobile station according to an embodiment of the invention is shown. Each time the receiver 402 obtains a dummy paging message, the dummy pattern generator 404 stores the dummy paging message 502 as a reference for generation of dummy patterns P during the decoding of a current paging message. In one embodiment, the previous dummy paging messages stored in the dummy pattern generator 404 is channel-decoded data bits $D_3$ output by the channel decoder 418. In another embodiment, the previous dummy paging message is a raw data $D_1$ received by the radio frequency module 412, or a de-interleaved data $D_2$ generated by the de-interleaving module 416. Those skilled in the art may practice the previous dummy paging message as equalizer output data or re-encoded data. The dummy pattern generator 404 then generates a dummy pattern P with reference to the previously received dummy paging message 502. In one embodiment, the dummy pattern P comprises a first artificial pattern 504. In another embodiment, the dummy pattern P comprises the first artificial pattern 504 and a second artificial pattern 506. In still another embodiment, the dummy pattern P comprises the first artificial pattern 504, the second artificial pattern 506, and a third artificial pattern 508. It is to be understood that the first, second and third artificial patterns 504, 506 and 508 respectively correspond to previously received second, third and fourth bursts.

The baseband processing module 414 then decodes the paging message according to the first burst 561 received by the radio frequency module 412 and the first artificial pattern 504 (may further with the second and third artificial patterns 506 and 508). When the dummy pattern only comprises the first artificial pattern 504, the de-interleave module 416 de-interleaves 114 bits of the first burst 561 and 114 bits of the first artificial pattern 504 to obtain a result of 228 bits. The result comprising 228 bits is then punctured with zero values to obtain a de-interleaved data 570 comprising 456 bits (data $D_2$ of FIG. 4). When the transmission quality is good, the first burst 561 is received without errors, and the channel decoder 418 can then decode the de-interleaved data 570 to recover a 228-bit full data content 580 (data $D_3$ of FIG. 4) of the paging message to determine whether the paging message is a dummy paging message. Thus, the mobile station 400 recovers full data content of a dummy paging message according to only one received burst according to embodiments of the invention.

It is to be understood that, when the received first burst corresponds to a significant paging message, the data content of the significant paging message cannot be recovered by an embodiment of the method shown in FIG. 5B. In addition, when the paging message is a dummy paging message and the transmission quality is bad, the first burst $D_1$ may be received with errors, resulting in the channel decoder 418 to yield erroneous data content $D_3$ of the paging message from the de-interleaved data $D_2$. During generation of the data content $D_3$ by the channel decoder 418, the paging channel handler 406 checks cyclic redundancy check (CRC) bits of the data content $D_3$ to determine whether the data content $D_3$ is correct. When the data content $D_3$ is not correct, the radio frequency module 412 may further receive a second burst, a third burst, or even a fourth burst of signals for subsequent decoding.

Figure 6A:
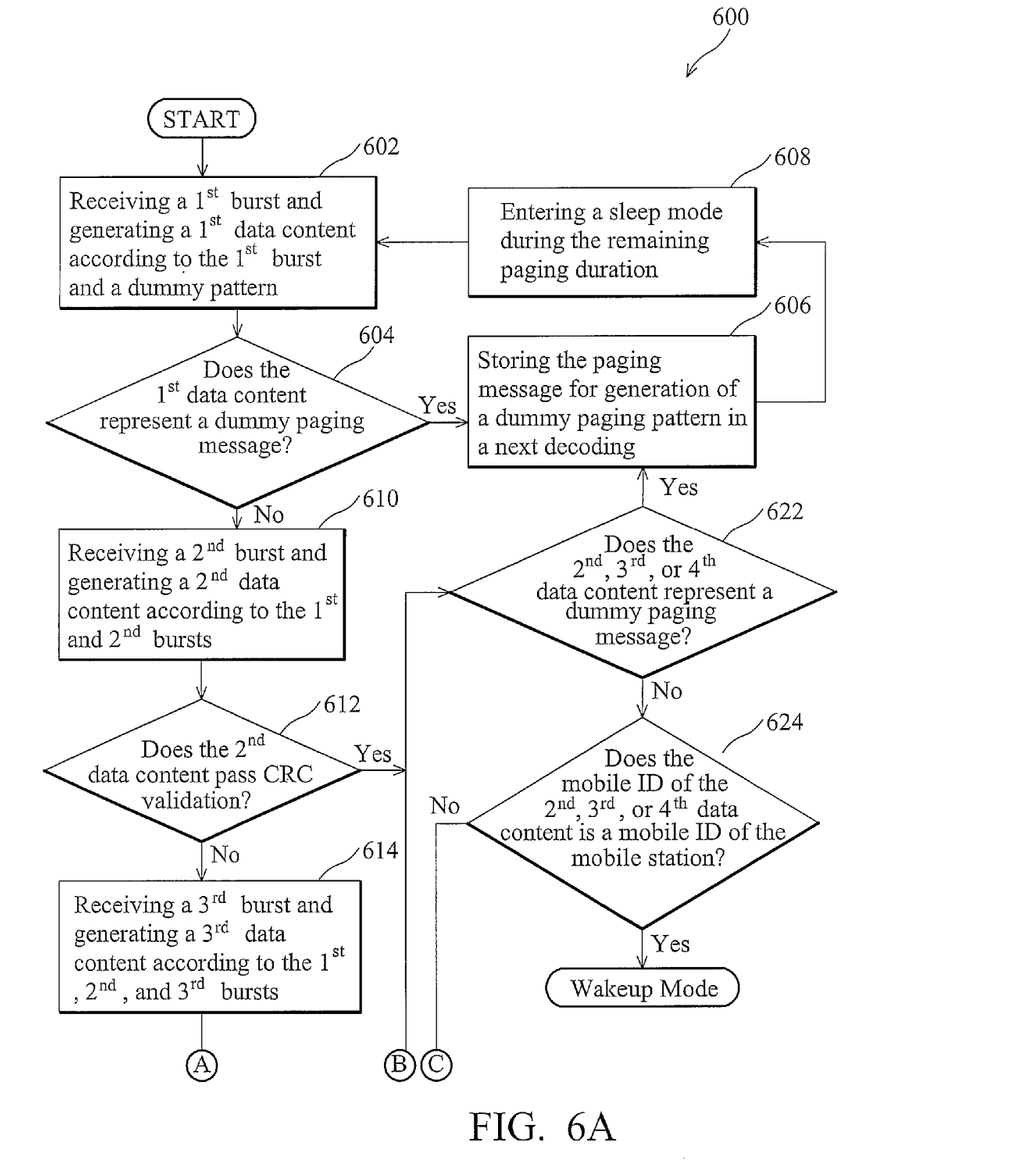
FIG. 6 is a flowchart of a method for decoding a paging message for a mobile station according to an embodiment of the invention.
Figure 6B:
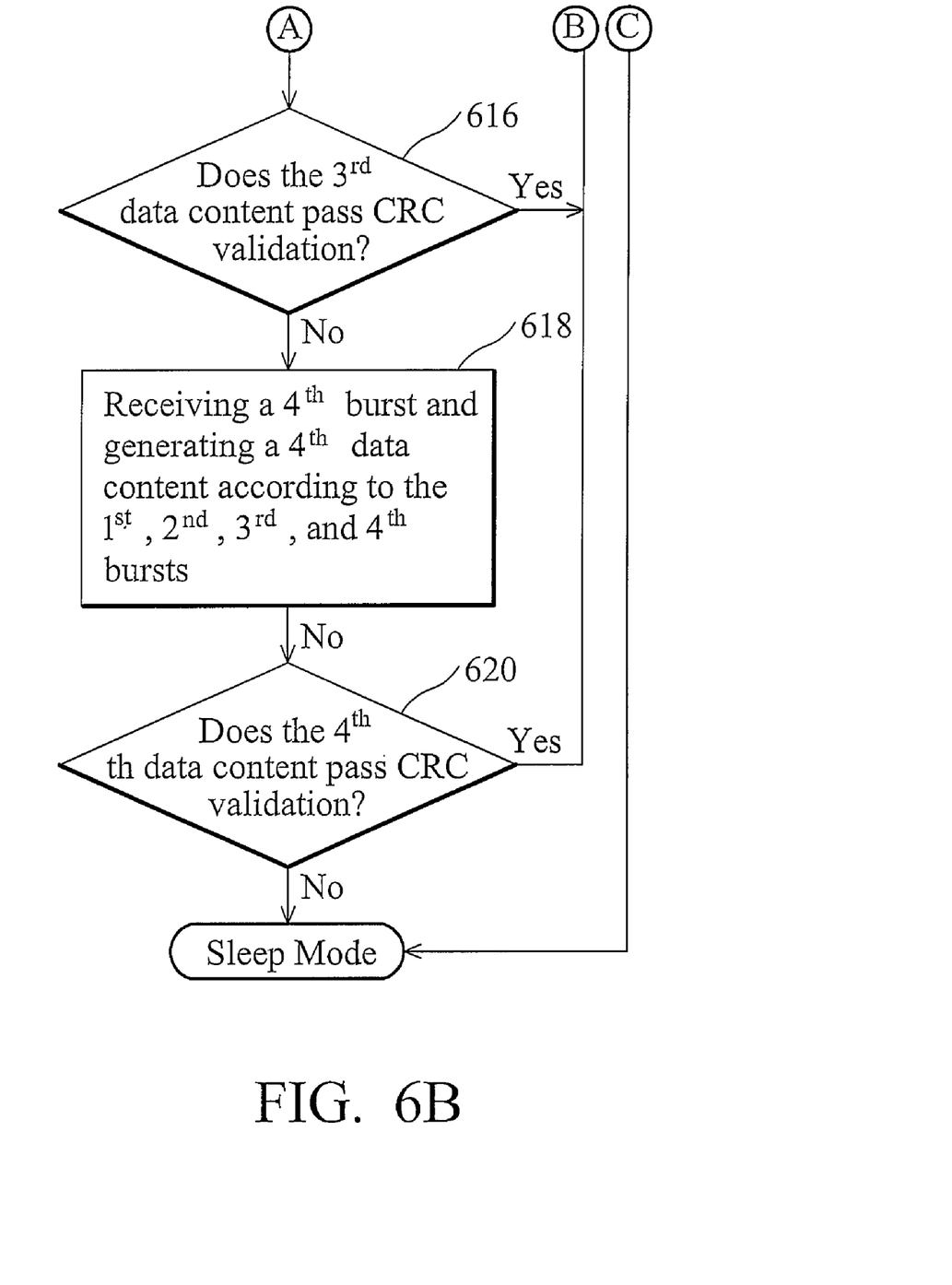

Referring to FIG. 6, a flowchart illustrating a method 600 for decoding a paging message by a mobile station 400 according to an embodiment of the invention is shown. First, the radio frequency module 412 receives a first burst for a paging message, and the baseband processing module 414 generates a first data content according to the first burst and a dummy pattern provided by the dummy pattern generator 404 according to an embodiment of the method shown in FIG. 5 (step 602). The paging channel handler 406 then determines whether the first data content represents a dummy paging message (step 604). When the first data content represents a dummy paging message, the received first burst is considered to correspond to a portion of a dummy paging message, and the decoded dummy paging content is stored for generation of a dummy pattern for the next decoding session (step 606). The determination of the first data content representing a dummy paging message may be achieved by verifying CRC bits of the decoded data bits. The paging channel handler 406 then directs the receiver 402 not to activate to receive remaining bursts of the paging message (step 608), enabling the mobile station 400 to enter a sleep mode during the remaining page duration. For example, the paging channel handler 406 issues control signals $C_1$, $C_2$, and $C_3$ to disable the radio frequency module 412 and the baseband processing module 414 during the remaining page duration. The current required by the mobile station is therefore reduced to leakage current, and the power consumption of the mobile station 400 is greatly reduced to improve the performance thereof.

When the previously decoded data content does not represent a dummy paging message (step 604), the first burst may correspond to a portion of a significant paging message, or may be received with errors due to bad transmission quality. The radio frequency module 412 then receives a second burst for the paging message (step 610), and the paging channel handler 406 then directs the baseband processing module 414 to recover a second data content according to the first burst and the second burst. When the second data content passes CRC validation (step 612), the second data content represents a paging message. When the second data content represents a dummy paging message, the dummy paging message is stored in step 606 and the mobile station enters into a sleep mode during the remaining page duration in step 608. When the second data content represents a significant paging message, the paging channel handler 406 further determines whether the mobile ID of the second data content is the ID of the mobile station 400. If so, the mobile station 400 enters a wakeup mode to perform a relevant operation in response to the second data content, such as receiving an incoming call. Otherwise, the mobile station 400 enters a sleep mode during the remaining page duration. It is to be understood that, when the second data content has the mobile ID of the mobile station 400, this significant paging message is for the mobile station 400, otherwise, for other mobile stations.

When the second data content does not pass CRC validation in step 612, the second data content can not be recognized, the radio frequency module 412 must further receive a third burst for the paging message in step 614, and the paging channel handler 406 then directs the baseband processing module 414 to recover a third data content of the paging message according to the first, second and third bursts. When the third data content pass CRC validation in step 616, the third data content is a paging message (maybe significant or dummy paging message). Otherwise, the third data content can not be recognized, a fourth burst is received in step 618, and then a fourth data content for the paging message is recovered according to the first, second, third and fourth bursts in step 618. Through the recursive processing of an embodiment of a method 600, no incoming call is missed, and the mobile station enjoys both advantages of low power consumption and precise decoding performance. Note that steps 614, 616 and 618 may be properly modified with operations directly receiving the third and fourth bursts and accordingly generating data content to reduce CRC validation. Moreover, it is to be understood that steps 610, 612, 614, 616 and 618 may be properly modified with operations directly receiving the second to fourth bursts and accordingly generating data content to reduce several CRC validation.

Figure 7:
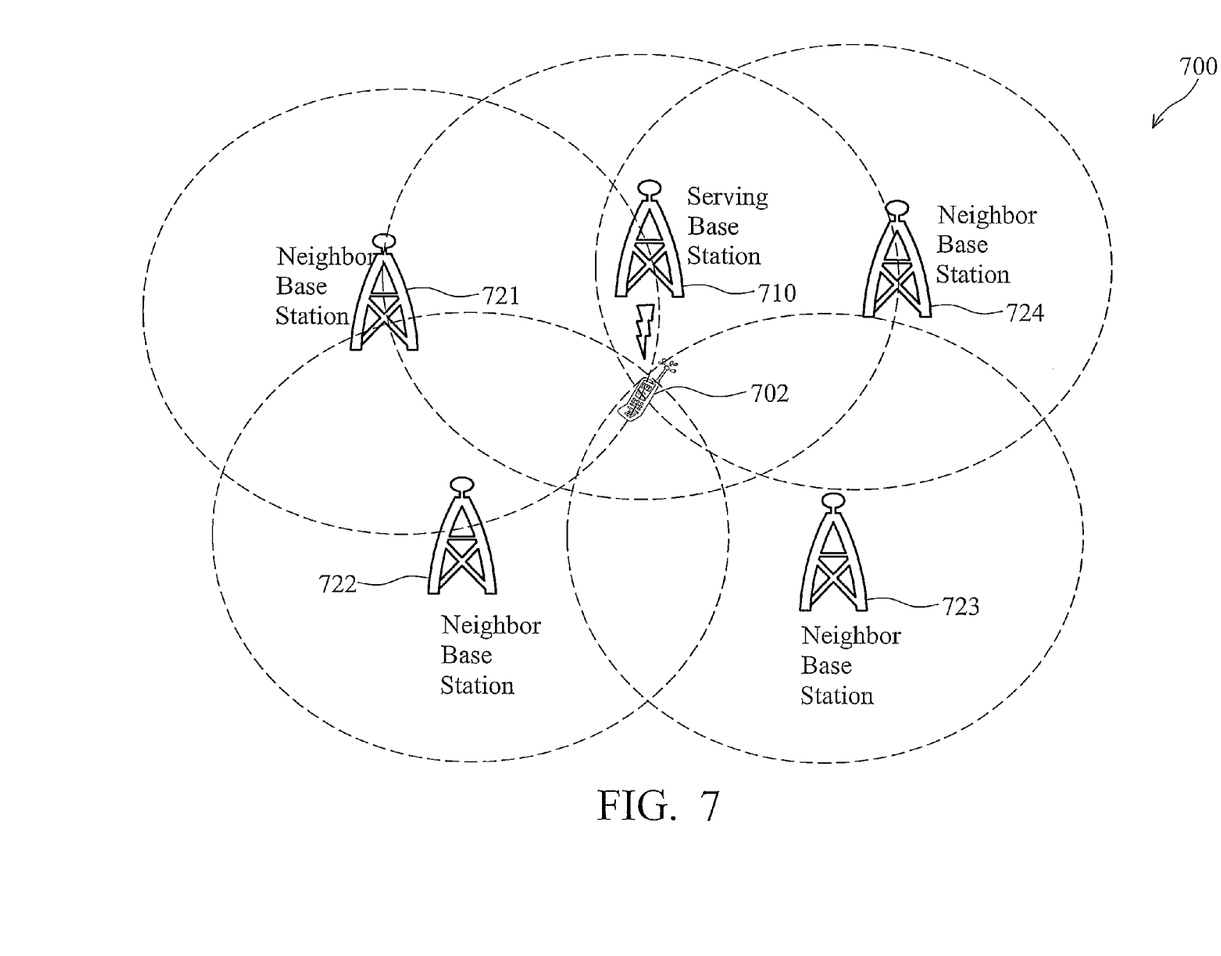
FIG. 7 shows a wireless communication system according to an embodiment of the invention.

Referring to FIG. 7, a wireless communication system 700 according to an embodiment of the invention is shown. The wireless communication system 700 comprises a mobile station 702, a serving base station 710, and a plurality of neighboring base stations 721~724. The serving base station 710 is the base station that has been authenticated by the mobile station 702, and utilized to transfer downlink packets from a remote mobile station to the mobile station 702, and uplink packets from the mobile station 702 to a remote mobile station. The quantity of the neighboring base stations may be seven or more. The mobile station 702 decodes paging messages periodically sent by the serving base station 710. In addition, the mobile station 702 simultaneously measures strengths of the radio frequency signals sent by the neighboring base stations 721~724. When the strengths of the radio frequency signals sent by one of the neighboring base stations 721~724 are obviously greater than the strength of the radio frequency signal sent by the serving station 710, the mobile station 702 may consider the neighboring base stations 721~724 as handover candidates.

Figure 8:
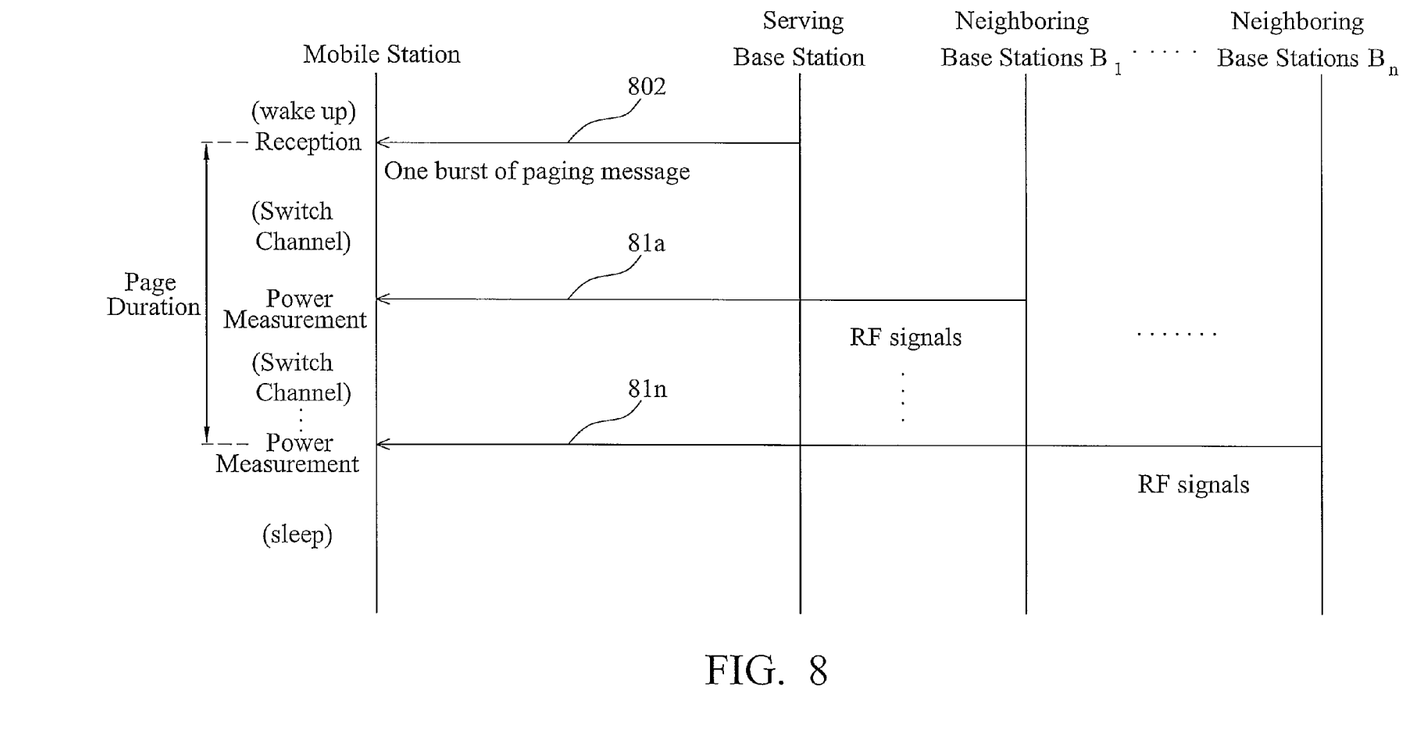
FIG. 8 shows a sequence diagram of signal processing for a mobile station according to an embodiment of the invention.

Because the mobile station 702 can recover full data content of a dummy paging message according to only first received burst according to an embodiment of the method shown in FIG. 5, the page duration can be shortened to one frame duration of 60/13 ms or 4.615 ms (traditionally, active paging period needs 2 to 4 frame duration). In addition to decoding of a dummy paging messages, the mobile station 702 can further measure strength of all the neighboring base stations in one frame duration following first burst reception. Referring to FIG. 8, a sequence diagram of signal processing for a mobile station according to an embodiment of the invention is shown. A serving base station first sends a burst 802 of a dummy paging message to the mobile station. The mobile station then activates, receives the burst 802, and recovers the dummy paging message according to the only received burst 802. When the neighboring stations $B_1$~$B_n$ respectively broadcast RF signals 81a~81n to the mobile station, the mobile station switches channels, listens to RF signals in the switched channels, and measures strengths of the listened RF signals sent by the neighboring stations $B_1$~$B_n$. Thereafter, the mobile station enters a sleep mode again. The page duration for the reception of the burst 802 to the measurement of the strengths of the RF signals 81a to 81n is shorter than one frame duration. Thus, standby current of the mobile station is greatly reduced, and power consumption of the mobile station is also greatly reduced. It is to be understood that the quantity of listened channels may changes according to the number of neighboring cells, and typically equals or exceeds seven.

Figure 9:
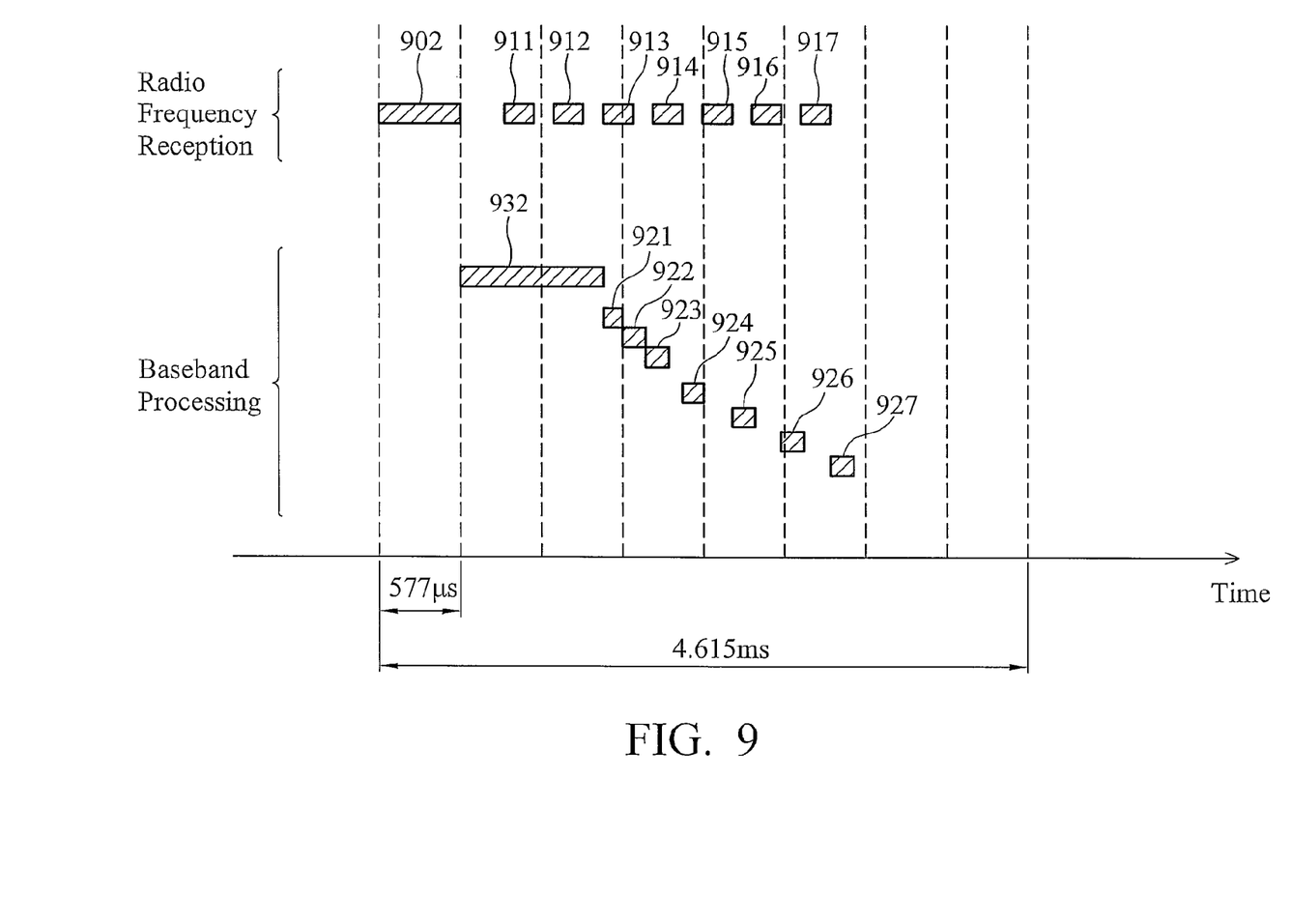
FIG. 9 is a schematic time slice diagram for processing a dummy paging messages from a serving base station and measuring strengths of RF signals from neighboring base stations according to an embodiment of the invention.
Figure 10:
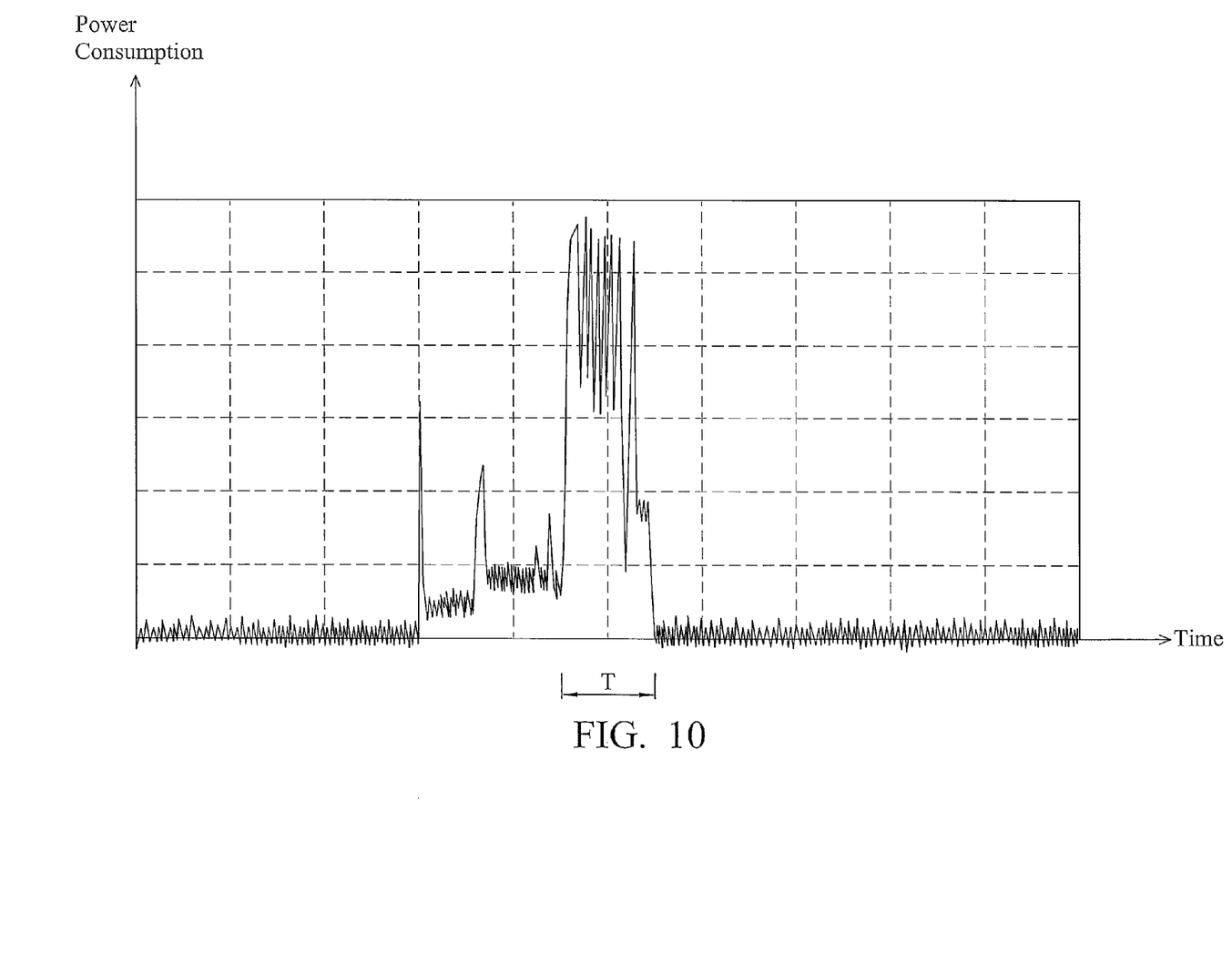
FIG. 10 is a schematic waveform diagram of stand-by current power consumption for simultaneously processing of a dummy paging message from a serving base station and measuring strengths of RF signals from neighboring base stations according to an embodiment of the invention.

Referring to FIG. 9, a schematic time slice diagram for processing of a dummy paging message from a serving base station and measuring strengths of RF signals from neighboring base stations according to an embodiment of the invention is shown. Assume that a mobile station comprises a radio frequency module receiving radio frequency signals, and a baseband processing module performing baseband processing. The radio frequency module first receives the first burst of a dummy paging message from a serving base station in the burst duration 902 of 577 µs. The baseband processing module then decodes the dummy paging message according to the only received first burst in period 932. The radio frequency module simultaneously switches channels and respectively receives multiple RF signals from multiple neighboring base stations in periods 911~917. The baseband processing module then respectively measures the strengths of the RF signals in periods 921~927. All signal processing including the reception of the burst, the reception of the neighboring cells' RF signals, the acquisition of the dummy paging message, and the measurement of the strengths is performed completely in one frame duration of 4.615 ms (milliseconds). The radio frequency module is then disabled after the last RF signal is received in period 917, and the baseband processing module is disabled after a strength of the last RF signal is measured in period 927. Thus, power consumption of the mobile station is greatly reduced. Referring to FIG. 10, a schematic waveform diagram of power consumption for simultaneously processing of a dummy paging message from a serving base station and measuring strengths of RF signals from neighboring base stations according to an embodiment of the invention is shown. Both recovery of a dummy paging message and power measurement of RF signals from over than seven neighboring stations may be completed during the period T shorter than one frame duration, and the mobile station then enters a sleep mode to reduce power consumption.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device for acquisition of a dummy paging message, comprising:
a dummy pattern generator, providing a first artificial pattern according to a previously received result corresponding to a dummy paging message;
a receiver, receiving a first burst for a paging message; and
a paging channel handler, controlling the receiver to recover a first data content for the paging message by decoding a joint of the first burst and the first artificial pattern, determining whether the first data content represents a dummy paging message, and directing the receiver not to activate to receive remaining bursts for the paging message when the first data content represents a dummy paging message;
wherein the dummy paging message is employed for synchronization between a mobile station comprising the electronic device, and a serving base station.

2. The electronic device as claimed in claim 1, wherein the dummy pattern generator further provides a second artificial pattern according to the previously received result, and the paging channel handler controls the receiver to recover the first data content according to the first burst, the first and second artificial patterns.

3. The electronic device as claimed in claim 1, wherein whether the first data content is a dummy paging message is determined by verifying cyclic redundancy check (CRC) bits of the first data content.

4. The electronic device as claimed in claim 1, wherein the previously received result is raw data of the dummy paging message received by a radio frequency module of the receiver, equalizer output data, de-interleaved data, channel-decoded data bits, or re-encoded data.

5. The electronic device as claimed in claim 1, wherein when the first content does not represent a dummy paging message, the receiver receives a second burst for the paging message, and the paging channel handler directs the receiver to recover a second data content according to the first burst and the second burst.

6. The electronic device as claimed in claim 5, wherein, after the second data content passes cyclic redundancy check (CRC) validation, the paging channel handler directs the receiver not to activate to receive remaining bursts for the paging message.

7. The electronic device as claimed in claim 5, wherein, after the second data content does not pass cyclic redundancy check (CRC) validation, the receiver receives a third burst of the paging message, and the paging channel handler directs the receiver to recover a third data content for the paging message according to the first burst, the second burst, and the third burst.

8. The electronic device as claimed in claim 7, wherein, after the third data content passes CRC validation, the paging channel handler directs the receiver not to activate to receive remaining bursts for the paging message.

9. An electronic device for acquisition of a paging message from a serving base station, and measuring strengths of radio frequency signals from a plurality of neighboring base stations, comprising:
a radio frequency module, receiving a burst for a paging message, switching channels, and receiving the radio frequency signals from the neighboring base stations via the switched channels; and
a baseband processing module, acquiring the paging message according to the burst, and measuring strengths of the radio frequency signals;
wherein the reception of the burst, the reception of the radio frequency signals, the acquisition of the paging message, and the measurement of the strengths are completely performed in one frame duration, and the strengths of the radio frequency signals are employed to determined signal quality.

10. The electronic device as claimed in claim 9, wherein the radio frequency module is disabled after the reception of the burst and the radio frequency signals, and the baseband processing module is disabled after the acquisition of the paging message and the measurement of the strengths.

11. The electronic device as claimed in claim 9, wherein the quantity of the radio frequency signals measured by the baseband processing module in one frame duration is seven or more.

12. The electronic device as claimed in claim 9, wherein the electronic device further comprises a dummy pattern generator providing an artificial pattern according to a previously received dummy paging message, and the baseband processing module recovers the dummy paging message according to both the burst and the artificial pattern.

13. The electronic device as claimed in claim 12, wherein the frame duration is substantially 4.615 ms (milliseconds).

14. A method for acquisition of a dummy paging message for a mobile station, comprising:
receiving a first burst for a paging message;
providing a first artificial pattern according to a previously received result corresponding to a dummy paging message;
recovering a first data content for the paging message by decoding a joint of the first burst and the first artificial pattern;
determining whether the first data content represents a dummy paging message; and
directing a receiver of the mobile station not to activate to receive remaining bursts for the paging message when the first data content represents a dummy paging message;
wherein the dummy paging message is employed for synchronization between the mobile station and a serving base station.

15. The method as claimed in claim 14, wherein the method further comprises:
providing a second artificial pattern according to the previously received result; and
acquiring the first data content according to the first burst, the first and second artificial patterns.

16. The method as claimed in claim 15, wherein the method further comprises:
providing a third artificial pattern according to the previously received result; and
acquiring the first data content according to the first burst, the first, second and third artificial patterns.

17. The method as claimed in claim 14, wherein the previously received result is raw data of the dummy paging message, de-interleaved data, or channel-decoded data bits.

18. The method as claimed in claim 14, wherein when the first data content does not represent a dummy paging message, the method further comprises:
receiving a second burst for the paging message; and
recovering a second data content according to the first burst and the second burst.

19. The method as claimed in claim 18, wherein the method further comprises directing the receiver not to activate to receive remaining bursts for the paging message when the second data content passes cyclic redundancy check (CRC) validation and represents a dummy paging message.

20. The method as claimed in claim 19, wherein, when the second data content passes CRC validation and represents a significant paging message, the method further comprises:
determining whether a mobile ID of the second data content is a mobile ID of the mobile station;
entering a sleep mode during the remaining page duration when the mobile ID of the second data content is not the mobile ID of the mobile station; and
entering a wakeup mode when the mobile ID of the second data content is not the mobile ID of the mobile station to perform a relevant operation in response to the second data content.

* * * * *